United States Patent [19]

Huang et al.

[11] 4,035,328
[45] July 12, 1977

[54] CONTINUOUS PROCESS FOR MAKING UREA FORMALDEHYDE PIGMENT

[75] Inventors: Denis K. Huang, Laurel; Jean Holden, Wheaton, both of Md.

[73] Assignee: Westvaco Corporation, New York, N.Y.

[21] Appl. No.: 592,745

[22] Filed: July 3, 1975

[51] Int. Cl.² .................. C08L 61/20; C08G 12/12; C08G 14/02; C08G 2/28
[52] U.S. Cl. .......................... 260/29.4 R; 162/166; 162/167; 260/67.6 R; 260/69 R; 260/70 A; 260/70 M; 260/70 R; 260/71; 260/849
[58] Field of Search ................ 260/69 R, 70 R, 71, 260/849, 29.4 R, 67.6 R, 70 M, 70 A

[56] References Cited

U.S. PATENT DOCUMENTS 3,849,378  11/1974  Griffiths et al. ................ 260/69 R

FOREIGN PATENT DOCUMENTS

| | | |
|---|---|---|
| 2,182,168 | 7/1973 | France |
| 2,046,496 | 3/1972 | Germany |
| 2,109,754 | 9/1972 | Germany |
| 2,202,202 | 8/1972 | Germany |
| 2,241,995 | 4/1974 | Germany |
| 2,262,197 | 7/1973 | Germany |

*Primary Examiner*—Murray Tillman
*Assistant Examiner*—T. De Benedictis, Sr.

[57] ABSTRACT

A white, bright and opaque urea formaldehyde pigment is prepared in a continuous process by precipitating a urea formaldehyde resin or prepolymer having a relatively low water tolerance and a relatively high viscosity in an aqueous precipitating bath containing an acid catalyst. The reaction is carried out by supplying the urea formaldehyde resin to one or more reactors each containing the precipitating bath at an elevated temperature and under agitation, wherein a precipitate begins to form almost immediately. The reaction is allowed to progress for a length of time sufficient to permit most of the higher molecular weight fractions of the resin to precipitate out, the precipitate is then filtered preferably at the reaction temperature, washed and collected. Meanwhile, the filtrate from the reaction is recycled back through the reactor or reactors whereupon additional urea formaldehyde resin is added along with an effective amount of a synthetic polymeric flocculant to assist in converting the lower molecular weight fractions of the resin in the recycled filtrate into a useful product. The synthetic polymeric flocculant also controls the solids content and optical efficiency of the precipitate produced.

1 Claim, 2 Drawing Figures

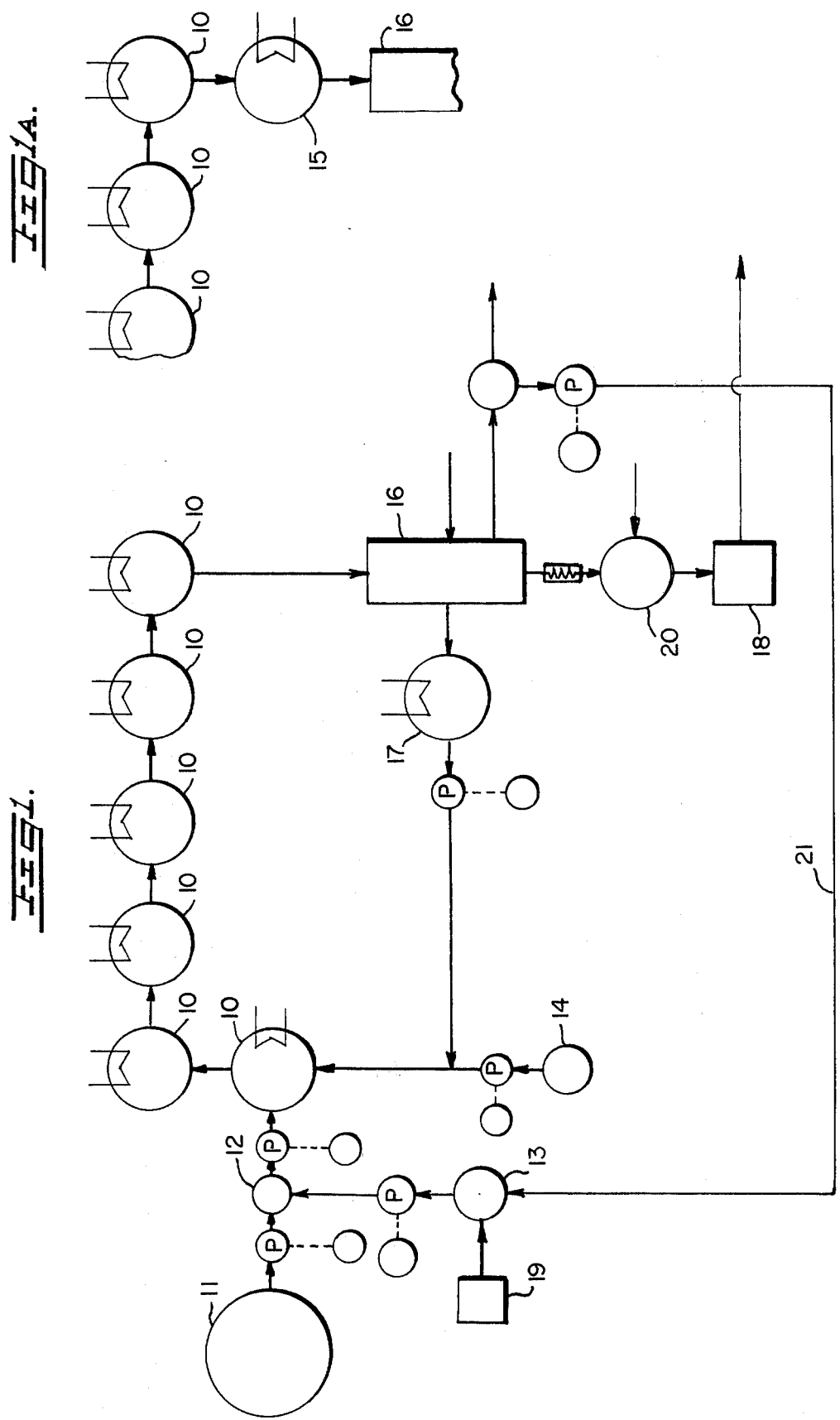

CONTINUOUS PROCESS FOR MAKING UREA FORMALDEHYDE PIGMENT

SUMMARY OF THE INVENTION

The invention herein is an improvement in the process disclosed in U.S. Pat. No. 3,849,378 assigned to the present assignee. In the prior patent, a process for making urea formaldehyde pigment is disclosed as consisting of the introduction of a urea formaldehyde resin having a water tolerance of from about 1.5 to 5.0 and a viscosity of from about 450–1500 cps (Brookfield, No. 4 spindle at 20 r.p.m., 50% solids measured at room temperature), into an aqueous precipitating bath containing from about 0.125 to 1.5% by volume of a strong mineral acid catalyst. The precipitating bath is maintained at a temperature of from about 20°–95° C., under agitation, and the resin is added to the bath at a resin to water ratio of from 1/16 to ⅜ over a period of time of from about 15 minutes to one hour. The mixture is then allowed to continue to react for a period of time of from about ½ to 5 hours before the precipitated pigment product is collected.

However, within the practical limits of reaction time desirable, and in order to produce the optimum product with maximum optical efficiency and economy, only a portion of the charge of urea formaldehyde resin added to the precipitating bath is actually converted into its pigmentary form in a single reaction. Thus, when the reaction is run under the controlled conditions set forth above and only for the optimum period of time, and the precipitate is filtered at or near the reaction temperature, only the higher molecular weight fraction of the urea formaldehyde resin charge is converted into pigment leaving the lower molecular weight fractions in solution in the filtrate. Therefore, in order to recover the remaining lower molecular weight fractions of the resin, the filtrate is recycled back through the reactors as the pigment is being prepared. Hence, in the continuous process, the filtrate is recycled by returning it to the precipitating bath reactors where additional urea formaldehyde resin and make-up water is added on a continuous basis. However, it was found that when the recycled filtrate was used for subsequent reactions, the opticl properties of the product obtained deteriorated. Accordingly, the present invention was developed to provide a continuous process based on the principles disclosed in prior U.S. Pat. No. 3,849,378, which would consistently produce an optically efficient urea formaldehyde pigment at high yields.

DESCRIPTION OF DRAWING

FIG. 1 shows a schematic flow sheet diagram for the continuous production of the pigment of the present invention; and, FIG. 1a is a partial schematic showing a modified version of the preferred process.

DETAILED DESCRIPTION

Based on the invention disclosed in prior U.S. Pat. No. 3,849,378, it was discovered that a urea formaldehyde pigment having a high optical efficiency could be produced in slurry form by introducing a urea formaldehyde resin having specific water tolerance and viscosity properties into an acid catalyst precipitating bath under prescribed controlled conditions. Moreover, additional work based on the process disclosed in the prior patent demonstrated that an optimum product could be produced by filtering the precipitate at or near the reaction temperature, but that such conditions left in solution the lower molecular weight fractions of the urea formaldehyde resin charge which it was deemed desirable to recover. Since it was known that the precipitation reaction occurred when the already partially polymerized resin underwent additional polymerization in the precipitating bath to finally form a precipitate, it was theorized that the lower molecular weight fractions remaining in the filtrate could be converted into useable pigment by recycling the filtrate back through the reactors so that more and more of the resin molecules could acquire the degree of polymerization required to lose their water solubility and form a precipitate. However, when the recycled filtrate produced a pigment of lesser optical properties than the original resin and at lower yields, the present invention was developed to overcome the disadvantageous loss in optical properties.

In carrying out the present invention, the optical properties of the pigment produced using the recycled filtrate from previous reactions is improved with the addition of an effective amount of a synthetic polymeric flocculent. The polymeric flocculants suitable for the present invention include hydrophilic colloids having a molecular weight in the range of from about 100,000 to 100,000,000 and functional groups such as hydroxyl, carboxylic, amide, amine, or quaternary compounds, which render the materials spontaneously soluble in water. Similar results have been obtained using the monomer acrylamide which is the primary monomer found in a great number of commercially available synthetic polymeric flocculants. In the practical application the above noted synthetic polymeric flocculants become partially absorbed on the surface of the hydrophobic resin particles. The absorbed flocculant materials are thus believed to form bridges between the resin particles to produce highly porous flocs which precipitate out of solution. The porosity of the precipitate obtained with the flocculant treated filtrate is reflected by the solids content of the filtered precipitate. In general the highly porous flocs produce a lower solids precipitate having a higher surface area and opacity than the precipitate obtained with the untreated filtrate.

The invention is believed to be best described with the aid of the following Examples.

EXAMPLE I

A simulated continuous reaction process was carried out by conducting a series of batch reactions where the filtrate from each preceding reaction was recycled back to the next subsequent reaction. The urea formaldehyde resin used in the experiment had a water tolerance of about 1.5 and a viscosity of about 750 cps (Brookfield No. 4 spindle, 20 r.p.m. 50% solids, at 120° F.). In each case, the resin to water ratio was maintained at about 1/16, the reaction was carried out at about 70° C. and the aqueous precipitating bath reactor contained about 0.5% sulphuric acid (by volume). For the first pass, 200 grams of the urea formaldehyde resin at 50% solids was added dropwise to the precipitating bath reactor over a period of one-half hour under constant agitation. A precipitate began to form almost immediately. The reaction was allowed to continue for an additional one hour and fifteen minutes (or for a total time of one and three quarter hours), and the precipitate obtained was filtered at the reaction temperature (70° C.). The solids content of the precipitate was measured, the dry yield of precipitate determined and the remaining filtrate was returned to the precipitating bath reactor along with enough make-up resin to maintain the resin to water ratio at about 1/16. In the same manner, two recycles were run and the data collected. The optical properties of the pigment produced was then measured from handsheets prepared with 10% of the pigment in the furnish. The results of the experiments set forth in Example I are shown in Table I.

TABLE I

Optical data corrected to basis weight of 60.4 gm/m²

| Sample | Resin Added gms. | Wet Yield gms. | Solids % | Dry Yield gms. | Brightness | Opacity |
|---|---|---|---|---|---|---|
| Control | — | — | — | — | 81.0 | 72.2 |
| First Pass | 200 | 152 | 9.8 | 14.9 | 84.6 | 85.1 |
| 1st. Recycle | 30 | 20 | 42.0 | 8.4 | 82.5 | 79.7 |
| 2nd. Recycle | 30 | 36 | 36.4 | 13.1 | 81.2 | 79.4 |

As can be seen from the data in Table I, when the unreacted filtrate from the first pass (plus make-up resin) is used, in the 1st recycle, the solids content of the precipitate produced increases considerably and produces a concurrent decrease in the opacity of the handsheet filled with the pigment. The same situation occurs when the filate from the 1st recycle (plus make-up resin) is used in the 2nd recycle. Of course, the trend established by the recycling of the filtrate as shown in Example I would also occur in a true continuous process until such time that equilibrium conditions were established. Accordingly, it may be seen that an additional yield can be obtained with the recycled filtrate, but at the expense of the desired optical efficiency.

However, since the production of an optically efficient pigment is desired for the papermaking process, the simple reuse of the filtrate in a continuous pigment manufacturing process is undesirable. Thus the present invention was developed to overcome the disadvantageous loss in optical efficiency of the pigment produced in a continuous manner. For this purpose, it was found that the pigment produced using recycled filtrate could be made more optically efficient with the addition of an effective amount of commercially available synthetic cationic and nonionic flocculants or retention aids. Similar effects were also obtained with the addition of a small amount of the monomer acrylamide to a more or less true continuous reaction process.

The use of retention aids in the manufacture of paper is well known. Generally, the addition of small amounts of a retention aid to the papermaking slurry improves fiber dispersion, enhances fiber-to-fiber bonding and produces notable improvements in both the wet and dry strength of the paper. The mechanism of the retention aid in the papermaking process depends upon the absorption of the retention aid on the cellulose fibers of the pulp. Similarly, it is believed that the addition of a flocculant or retention aid to the herein described pigment manufacturing process produces a more efficient pigment when the flocculant forms a link between the lower molecular weight resin fractions available in the filtrate to produce large flocs of sufficient molecular weight to precipitate out of solution. The large flocs obtained are highly porous and have a high surface area which provides good optical efficiency.

Two such retention aids that have been found to perform well in the present invention are "Delfloc 50", a cationic polymer retention aid supplied by Hercules Incorporated, and consisting of a polyamide plus inorganic sulfate at 12.5% solids, and "Natron 86", another cationic retention aid supplied by National Starch and Chemical Corporation, and consisting of a copolymer of 2-aminoethylacrylate nitrate and 2-hydroxyporpylacrylate. However, it is believed that any synthetic polymeric flocculant including hydrophilic colloids having a molecular weight in the range of from about $1 \times 10^5$ to $1 \times 10^7$ and functional groups such as hydroxyl, carboxylic, amide, amine or quaternary compounds which render the resin in the filtrate spontaneously soluble in water, would be useful in the present invention. Moreover, similar results were found with the monomer acrylamide as a flocculant material in the present invention.

EXAMPLE II

A second set of experiments were carried out substantially as set forth in Example I except that for each recyle, a small amount of the retention aid Natron 86 was added to the precipitating bath reactor. The amount of retention aid (0.01% Natron 86) added to each of the first and second recylces was a weight percentage of the solids of the retention aid based on the solids of the urea formaldehyde resin in the system. The urea formalidehyde resin used in these experiments was the same as that used in Example I except that it had a viscosity of about 225 cps (measured at room temperature). The reaction conditions were the same as those used in Example I and the data taken was also the same. The optical properties of the pigment produced was measured from handsheets prepared with 10% of the pigment in the furnish and the results obtained are shown in Table II.

TABLE II

Optical data corrected to basis weight of 60.4 g/m²

| Sample | Resin Added gms. | Wet Yield gms. | Solids % | Dry Yield gms. | Brightness | Opacity |
|---|---|---|---|---|---|---|
| Control | — | — | — | — | 79.4 | 72.4 |
| First Pass | 200 | 115 | 12.4 | 14.3 | 85.5 | 86.4 |
| 1st. Recycle 0.01% Natron 86 | 30 | 14 | 21.6 | 3.6 | 83.5 | 82.3 |
| 2nd. Recycle 0.01 Natron 86 | 30 | 63 | 27.4 | 17.3 | 82.2 | 81.3 |

As can be seen from the data in Table II, when the unreacted filtrate from the first pass (plus make-up resin) is used in the 1st recycle, the solids content of the precipitate produced increased only about one-half as much as the same conditions shown in Table I without retention aid. Accordingly, the Opacity of the handsheet containing the pigment produced from the 1st recycle remained fairly high. The same situation occurred when the filtrate from the 1st recycle (plus make-up resin) was used in the second recycle. The solids content of the pigment produced remained fairly low with only a slight loss in opacity. Thus, as noted in Example I, the trend established by recycling the filtrate with the addition of a small amount of retention aid in a simulated continuous process would also occur in a true continuous process until such time that equilibrium conditions were reached. After that time, the solids content of the precipitate and its optical efficiency would remain practically stable. Accordingly, it may be seen from the results set forth in Table II that the filtrate can be recycled with the addition of retention aid to produce a pigment having a good optical efficiency.

Several other experiments were conducted by varying the addition of the retention aid "Natron 86" at the different levels 0.1%, 0.25%, 0.50% and 2.0%. However, at the 2.0% addition level, the recycled filtrate gelled in the precipitating bath reactor. Therefore, for the purpose of the present invention, an effective amount of retention aid would be defined as less than 2.0% by weight and preferably between about 0.01% and 0.5%. Obviously, however, depending on the retention aid used, some amount of experimentation would be required to establish the optimum level of addition desired.

EXAMPLE III

The simulated continuous reaction process of the present invention was practiced in several experiments to show the optical efficiency obtainable with varying amounts of addition of retention aid. The resin used in these experiments had a water tolerance of about 1.5 and a viscosity of about 400–450 cps (at room temperature). For each of the recycle condition, the reaction was carried out at about 70° C. and the aqueous precipitating bath reactor contained about 0.5% sulphuric acid (by volume). For the first pass, 200 grams of the urea formaldehyde resin at 50% solids was added to the reactor substantially as set forth in Example I to achieve a resin to water ratio of about 1/16. After the reaction, the precipitate obtained was cooled to about 25° C. and filtered. For the recycles, the filtrate was returned to the precipitating bath reactor where an additional 200 grams of the urea formaldehyde resin (at 50% solids) was added to the reaction, substantially as would be done in a continuous process, along with a small amount of retention aid. At this point the resin to water ratio in the precipitating bath reactor increased, but such an occurrence would be expected at the start-up of a continuous process until such time that equilibrium conditions were reached. The optical properties of the pigments produced from the first pass and from the recycles with retention aid were measured from handsheets prepared with 10% of the pigment in the furnish. The results of the experiments described in Example III are shown in Table III.

TABLE III

| | Optical data corrected to basis weight of 60.4 g/m² | | | | | |
|---|---|---|---|---|---|---|
| Sample | Resin Added gms. | Solids % | Wet Yield gms. | Dry Yield gms. | Brightness | Opacity |
| First Pass | 200 | 26.8 | 160 | 42.9 | 83.7 | 77.2 |
| Recycle 0.25% "Natron 86" | 200 | 24.5 | 286 | 70.1 | 84.6 | 79.9 |
| First Pass | 200 | 28.9 | 148 | 42.7 | 82.9 | 78.1 |
| Recycle 0.50% "Natron 86" | 200 | 15.1 | 422 | 63.6 | 84.2 | 79.3 |
| First Pass | 200 | 20.7 | 174 | 36.0 | 84.1 | 77.9 |
| Recycle 0.50% "Delfloc 50" | 200 | 20.6 | 317 | 65.3 | 84.4 | 79.3 |

As can be seen from the data in Table III, where the single recycles were run at two different levels of addition of "Natron 86" and with the "Delfloc 50" retention aids, the dry yields were very high and the optical efficiency of the pigment produced fairly low. These results were a result of the cooling of the pigment precipitate before filtering and also probably because the resin to water ratio for each recycle was changing. These two factors permitted more of the lower molecular weight fraction of the resin prepolymer to precipitate from solution accounting for the higher dry yields. On the other hand, the increase in opacity achieved with the pigment produced from the recycles demonstrated the effectiveness of the retention aid in producing a lower solids precipitate having larger flocs of greater porosity.

In the above described experiments, a typical continuous process was simulated by running batches continuously with the filtrate from the preceding batch recycled to the next subsequent batch. In a continuous process as contemplated by this invention, the resin and precipitating bath would be continuously supplied as needed for the reactors available with the retention aid added to the recycled filtrate. FIG. 1 shows a typical flow sheet for the continuous production of the pigment of the present invention. The system is started up by initially charging the precipitating bath reactors 10 with water and the desired amount of acid catalyst (from about 0.125 to 1.5% by volume of a strong mineral acid) from the acid storage tank 14. The precipitating bath reactors are provided with heating means and agitation means and when heated to the proper reaction temperature (from about 20–95° C.), the urea formaldehyde prepolymer (having a water tolerance of from about 1.5 to 5.0 and a viscosity of from about 450–1500 cps. at room temperature), is conducted to the reactors 10 from the resin storage tank 11. The precipitation reaction immediately begins to take place and is allowed to continue for up to 5 hours before the first precipitate is washed and filtered at a temperature of from about 25°to 70° C. or simply filtered hot at about the desired reaction temperature of 70° C. Where the pigment is cooled before filtering, the cooling stage 15 shown in FIG. 1a would be inserted in the flow sheet. In the filter 16, that may be of the vacuum type, the collected pigment is separated from the filtrate with the filtrate going to the filtrate holding tank 17 and the pigment going to a homogenization stage. Before being homogenized to the desired particle size in a colloid type mill 18, there is a provision 20 for pH adjustment of the pigment if required. At this point, the pigment is either stored for use on site or dried, such as by spray drying, to a moisture content of 75% or less for bagging and shipment to the user.

Meanwhile, the filtrate from the filtrate holding tank 17 is conducted or recycled back to the reactors 10 for further reaction and polymerization. Of course during the entire reaction, make-up resin from tank 11 and make-up water from line 21 is continuously being supplied to the reactors 10 to produce the continuous process. However, when the filtrate begins to recycle through the system, provision is made at 19 for adding an effective amount of retention aid to the filtrate to increase the optical efficiency of the pigment produced by controlling the solids content of the precipitate. The retention aid storage tank 19 is shown in FIG. 1 as being connected to a dissolving tank 13 where the retention aid is dissolved in the filtrate before being conducted to the mixing chamber 12 where the treated filtrate is mixed with the make-up resin. In the above noted fashion, the pigment manufacturing process of the present invention is operated on a continuous basis with adequate controls for resin to water ratio, reaction temperature and time, filtering temperature and retention aid addition. The process flow sheet shown in FIG. 1 is designed for ease of operation in actual production where a plurality of reactors 10 would be used. Accordingly, the present invention contemplates the use of adequate valves, pumps and instruments for controlling and monitoring the different stages of the reaction.

EXAMPLE IV

In yet another experiment where a continuous reaction process was attempted with the monomer acrylamide, a slightly different set-up than that used in Examples I–III was employed. In the experiment, two three liter reactors were connected in series by a siphoning system. Initially, 1600 ml. of precipitating bath containing 0.5% acid catalyst was added to the first reactor, the temperature was raised to about 70° C. and agitation of the mixture was started. 200 grams of resin at 50% solids was then metered into the reactor over a period of about one-half hour for the initial reaction and to achieve a resin to water ratio of about 1/16. The resin used had a water tolerance of about 1.5, a viscosity of about 650 cps (at room temperature) and contained about 0.5% (by weight) of the monomer acrylamide. After the initial batch of resin with acrylamide was added to the bath, additional resin mixture and precipitating bath was pumped into the reactor at a rate of about 50 cc. per minute until the full three liter volume was reached. At that time, and with the raw materials still being pumped into reactor No. 1, the mixture from reactor No. 1 was siphoned into reactor No. 2. The residence time for the original charge to flow through reactor No. 1 and into the second reactor was about 2 hours. When the second reactor became filled, precipitate that had been forming all along was taken off, cooled at 25° C. and filtered. The solids content of the precipitated pigment was measured, the dry yield determined and the filtrate left was metered back into reactor No. 1 along with enough additional resin mixture to maintain the resin to water ratio at about 1/16. The process was allowed to continue with precipitate being collected at one-half hour intervals. The optical properties of the pigment produced was measured as in Examples I–III from handsheets prepared with 10% of the pigment in the furnish. The results obtained are shown in Table IV.

TABLE IV

| | Opacity data corrected to 60.4 g/m² basis weight | | | | | |
|---|---|---|---|---|---|---|
| Sample | Resin Added gms. | Wet Yield gms. | Solids % | Dry Yield gms. | Brightness | Opacity |
| 221 A | 200 | 80 | 24.0 | 19.2 | 83.8 | 79.2 |
| 221 B | — | 130 | 20.5 | 26.6 | 83.7 | 79.2 |
| 221 C | — | 141 | 27.8 | 39.2 | 83.9 | 78.5 |
| 221 D | — | 258 | 24.0 | 62.0 | 82.9 | 77.5 |
| 221 E | — | 122 | 30.4 | 37.1 | 83.4 | 77.7 |

Sample 221 A was taken after the reaction had continued for about 2 hours. After sample 221 A, the filtrate that had been collected was recycled back to the precipitating bath reactor No. 1. The reaction continued for another 30 minutes and sample 221 B was taken. The same procedures were used for taking samples 221 C, 221 D, and 221 E by continuous recycling of the filtrate with the addition of the urea formaldehyde resin containing 0.5% acrylamide at the 1/16 ratio.

The results of the experiment show that both the solids content of the precipitate and the optical properties of the pigment may be stabilized with a continuous process using the monomer acrylamide.

Accordingly, as may be seen from a review of the above description, a continuous process has been described for converting a urea formaldehyde resin into a pigment having good optical properties for use in a papermaking operation. The novelty of the present invention is believed to lie in the use of a retention aid with the process whereby pigment having the desired optical properties can be produced by continuously recycling the filtrate from the process.

The optimum process conditions for carrying out the process can vary slightly but in general should adhere to the following conditions. The urea formaldehyde resin or prepolymer used should be reacted to at least its water insoluble stage and have a water tolerance of from about 1.5–2.0 and a viscosity of from about 450–1500 cps (at room temperature) at 50% solids. The precipitating bath in the reactor is an aqueous bath containing from about 0.125–1.0% of an acid catalyst with the preferred acid being either $H_2SO_4$ or HCl. The residence time of the resin in the precipitating bath may vary from about 45 minutes to 5 hours and prefeably from about 45 minutes to 1 hour 30 minutes, under agitation and at a temperature of from about 25°–90° C., and the resin to water ratio may vary from about 1/16 to 3/8. The final product produced will contain particles ranging from about 0.1 to 0.5 micron in size, and after homogenization be contained in an agglomerated structure of from about 3 to 6 microns.

It will of course be understood that the present invention is not limited to the terms of the foregoing description, but will comprise on the contrary all the alternative forms and improvements within the scope of those skilled in the art and particularly as defined in the appended claims.

We claim:

1. A continuous process for manufacturing a white, bright and opaque precipitated urea formaldehyde pigment comprising:

a. supplying on a continuous basis, a urea formaldehyde resin to a plurality of serially connected reaction vessels, said resin having a water tolerance of from about 1.5 to 5.0 and a viscosity of at least about 450 cps at 50% solids, each of said reaction vessels being precharged with an aqueous acid catalyst precipitating bath containig from about 0.125 to 1.5% by volume of a strong mineral acid at a temperature of from about 20°–95° C,;

b. reacting the mixture of resin and precipitating bath in said reaction vessels at a resin to water ratio of from about 1:16 to 3:8 under agitation for a period of time of from about 1/2 to 5 hours including the time for addition of the resin to the precipitating bath to permit most of the higher molecular weight fractions of the resin to react and precipitate in the precipitating bath;

c. filtering the precipitated pigment product formed in step (b) from the precipitating bath at a temperature of from about 25° to 70° C;

d. recycling, on a continuous basis the filtrate obtained from step (c), containing the unreacted lower molecular weight fractions of the resin, back into said reaction vessels; and, e. introducing into the recycled filtrate after each filtering step from about 0.01% to about 0.5% by weight based on the solids of the urea formaldehyde resin supplied to said reaction vessels of a flocculant material selected from the group consisting of a hydrophilic colloid having a molecular weight in the range of from about 100,000 to 100,000,000 and a functional group selected from the class consisting of hydroxyl, carboxylic, amide, amine and quaternary compounds+ and acrylamide.

* * * * *